(12) United States Patent
Robison et al.

(10) Patent No.: US 10,990,687 B2
(45) Date of Patent: Apr. 27, 2021

(54) SYSTEM AND METHOD FOR USER MANAGED ENCRYPTION RECOVERY USING BLOCKCHAIN FOR DATA AT REST

(71) Applicant: DELL PRODUCTS, LP, Round Rock, TX (US)

(72) Inventors: Charles D. Robison, Buford, GA (US); Christopher D. Burchett, Lewisville, TX (US); David Konetski, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 296 days.

(21) Appl. No.: 15/666,095

(22) Filed: Aug. 1, 2017

(65) Prior Publication Data
US 2019/0266334 A1    Aug. 29, 2019

(51) Int. Cl.
*G06F 21/60* (2013.01)
*H04L 9/06* (2006.01)
*H04L 9/32* (2006.01)
*G06F 21/56* (2013.01)
*H04L 9/08* (2006.01)
*G06F 21/64* (2013.01)

(52) U.S. Cl.
CPC .......... *G06F 21/602* (2013.01); *G06F 21/566* (2013.01); *G06F 21/64* (2013.01); *H04L 9/0637* (2013.01); *H04L 9/0866* (2013.01); *H04L 9/0894* (2013.01); *H04L 9/3213* (2013.01); *H04L 9/3226* (2013.01); *H04L 9/3239* (2013.01); *H04L 9/3278* (2013.01); *G06F 2221/034* (2013.01); *H04L 2209/38* (2013.01)

(58) Field of Classification Search
CPC ...... G06F 21/566; G06F 21/602; G06F 21/64; G06F 2221/034; H04L 2209/38; H04L 9/0637; H04L 9/0866; H04L 9/0894; H04L 9/3213; H04L 9/3226; H04L 9/3239; H04L 9/3278
See application file for complete search history.

(56) References Cited

U.S. PATENT DOCUMENTS

| | | | |
|---|---|---|---|
| 5,241,599 A * | 8/1993 | Bellovin | H04L 9/0844 380/28 |
| 6,160,891 A * | 12/2000 | Al-Salqan | H04L 9/0643 380/277 |
| 6,549,626 B1 * | 4/2003 | Al-Salqan | H04L 9/0643 380/277 |
| 8,595,501 B2 * | 11/2013 | Rose | H04L 63/0853 713/172 |
| 8,849,757 B2 | 9/2014 | Kruglick | |
| 10,116,693 B1 * | 10/2018 | Robinson | H04L 67/42 |
| 2008/0049939 A1 * | 2/2008 | Canetti | H04L 9/0863 380/277 |
| 2009/0217058 A1 * | 8/2009 | Obereiner | G06F 21/79 713/193 |

(Continued)

*Primary Examiner* — Trang T Doan
(74) *Attorney, Agent, or Firm* — Larson Newman, LLP

(57) ABSTRACT

An information handling system includes a memory for storing user data and a processor. The processor is configured to create a key, create a puzzle from the key, publish the puzzle to a ledger; encrypt user data in the memory using the key; retrieve the puzzle from the ledger when a user has lost access to the key; solve the puzzle to recover the key; and decrypt the user data.

20 Claims, 4 Drawing Sheets

(56) References Cited

U.S. PATENT DOCUMENTS

| | | | |
|---|---|---|---|
| 2009/0323963 A1* | 12/2009 | McTeer | H04L 9/0894 380/277 |
| 2015/0248552 A1* | 9/2015 | El Khoury | G06F 21/45 713/155 |
| 2015/0297988 A1* | 10/2015 | Fujita | A63F 13/2145 463/9 |
| 2016/0306750 A1* | 10/2016 | Tucker | H04L 9/0869 |
| 2016/0358165 A1 | 12/2016 | Maxwell | |
| 2017/0006064 A1* | 1/2017 | Agarwal | H04L 63/10 |
| 2017/0046698 A1 | 2/2017 | Haldenby et al. | |
| 2017/0048209 A1* | 2/2017 | Lohe | H04L 63/0442 |
| 2018/0092025 A1* | 3/2018 | Selander | H04W 12/084 |
| 2018/0167201 A1* | 6/2018 | Naqvi | H04L 63/0861 |
| 2018/0254891 A1* | 9/2018 | Linder | G06Q 20/3829 |
| 2018/0375655 A1* | 12/2018 | Thom | H04L 63/061 |
| 2019/0189254 A1* | 6/2019 | Roennow | A61B 5/6813 |

\* cited by examiner

SYSTEM AND METHOD FOR USER MANAGED ENCRYPTION RECOVERY USING BLOCKCHAIN FOR DATA AT REST

FIELD OF THE DISCLOSURE

This disclosure generally relates to information handling systems, and more particularly relates to user managed encryption recovery using blockchain for data at rest.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

SUMMARY

An information handling system can include a memory for storing user data, and a processor. The processor can be configured to create a key, create a puzzle from the key, publish the puzzle to a ledger, encrypt user data in the memory using the key, retrieve the puzzle from the ledger when a user has lost access to the key, solve the puzzle to recover the key, and decrypt the user data.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

Figure 1:
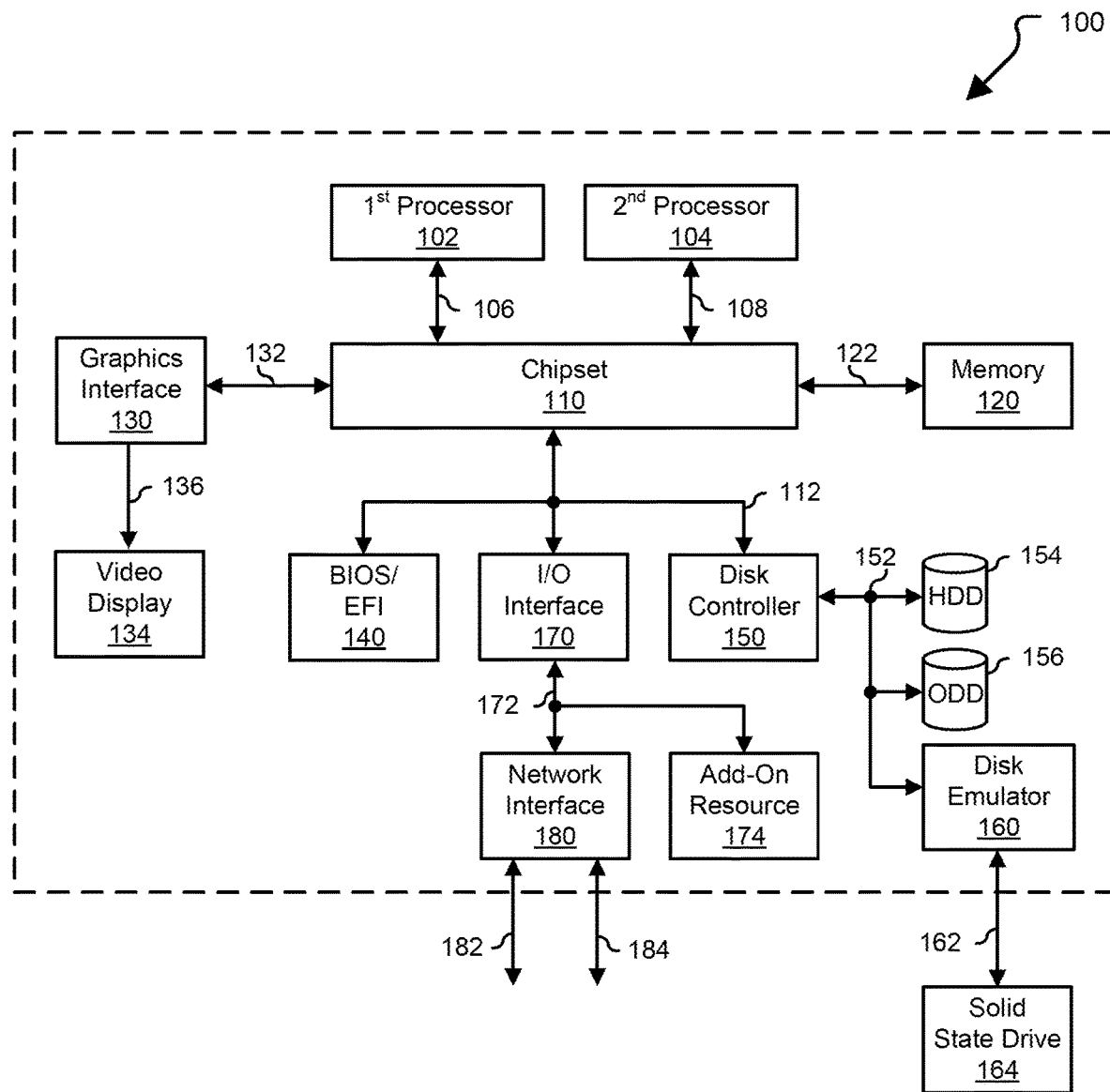
FIG. 1 illustrates a block diagram of an information handling system according to one aspect of the disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1134 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Data encryption has become the new normal for securing user's device and its subsequent data but implementation methods have varied substantially from one solution provider to the next. Generally, the technology provider is the primary architect of the design and therefore often liable for the direct management of the user's encryption keys. Even more contentious has been the recovery methods in the case where a user password or decryption key has been lost/unavailable resulting in data loss. The fear of data loss can be the most severe of concerns and fuels reluctance to incorporate data encryption as standard practice on all devices. One solution can be to remove the reliance on the tech provider to manage the encryption keys and provide a public key management solution that delivers transparency and auditability. To ensure trust and adoption, the solution should be robust, redundant, and always available for key management and recovery.

An always available, non-centralized, trusted key escrow agent with a verified code base can be provided required to manage keys. The keys can also protected from intercept and other malicious behavior. In a managed environment, the escrow service can meet these security requirements through an IT managed infrastructure which provides the environment and controls to secure this data and insures that the escrow service code can be verified and run on a server with strict authorization, controls and permissions. The issue needs to be resolved for non-professionally managed users (no IT environment) where the solution required to meet these security requirements is not readily available. Alternatively, an independent key escrow service could be procured from a technology provider, but the user is not guaranteed the technology provider puts the user interests first. For example, the technology provider may be pressured from law enforcement to back-door the encryption and surrender the key information.

A blockchain is a distributed database that can be used to maintain a continuously growing list of records, called blocks. Each block can contain a timestamp and a link to a previous block. A peer-to-peer network collectively adhering to a protocol for validating new blocks can manage a blockchain. By design, blockchains can be inherently resistant to modification of the data and can have high *Byzantine* fault tolerance. Decentralized consensus can therefore be achieved with a blockchain. Once recorded, the data in any given block cannot be altered retroactively without the alteration of all subsequent blocks and the collusion of the network. Functionally, a blockchain can serve as "an open, distributed ledger that can record transactions between two parties efficiently and in a verifiable and permanent way".

Smart contracts are computer protocols that facilitate, verify, or enforce the negotiation or performance of an agreement. In the context of blockchain, smart contracts can be used for general-purpose computation that takes place on a blockchain or distributed ledger. Smart contracts can be treated as autonomous scripts or stateful decentralized applications that are stored in the blockchain for later execution.

The disclosed systems and methods can create an always available, public sourced, encrypted key management system to retain user's device encryption keys which can be used for recovery on demand without being managed by or associated with the technology provider and offers audit controls and visibility.

Figure 2:
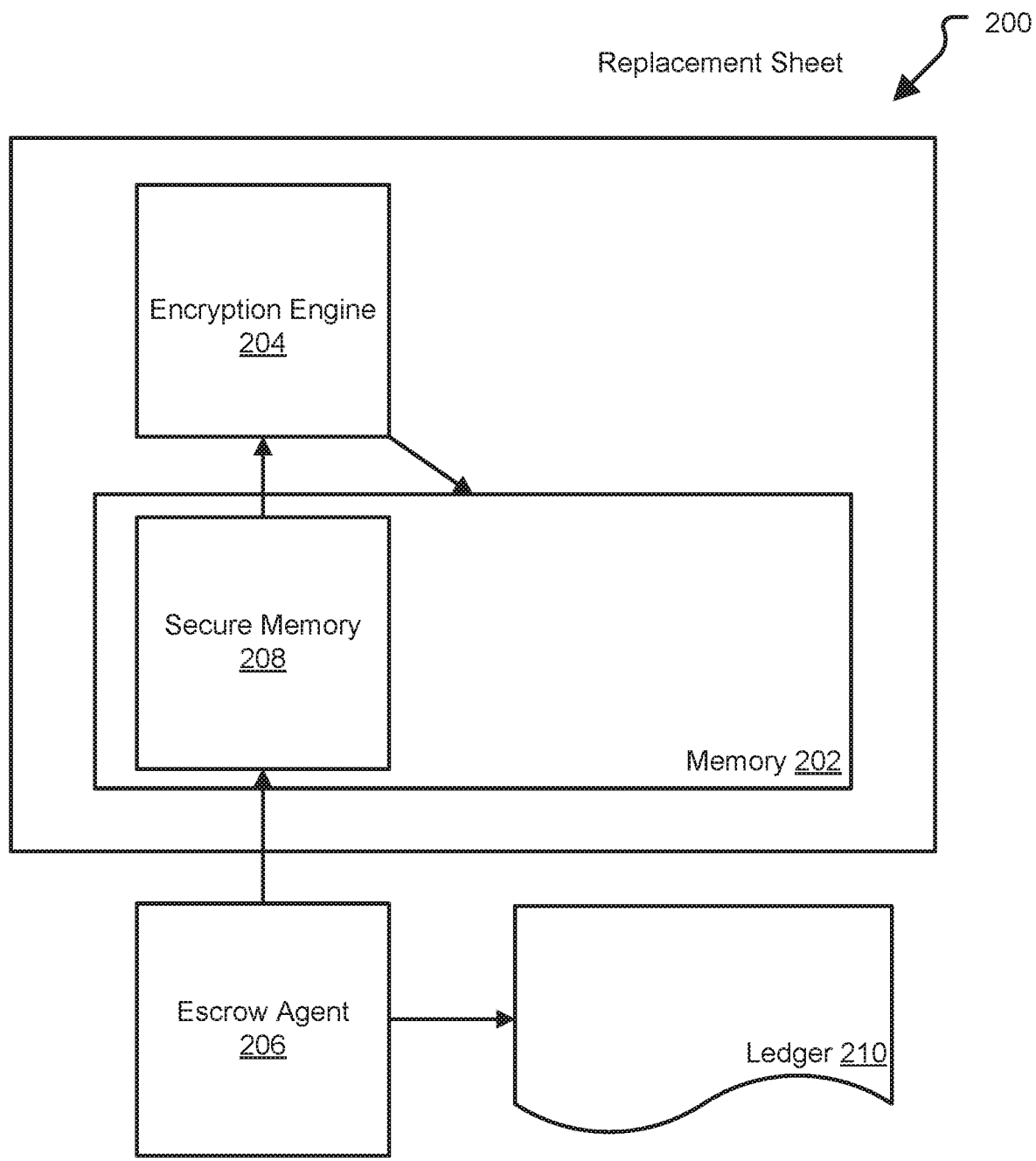
FIG. 2 illustrates a block diagram of a encryption recovery system according to aspects of the disclosure.

FIG. 2 illustrates an exemplary user device 200. Device 200 can include a memory 202 and an encryption engine 204. The memory 200 can include a secure memory 208, such as for storing encryption keys. The secure memory can be secured with a device specific key. In various embodiments, the device specific key can include a user-selected portion, such as a personal identification number (PIN) and a device specific portion. The device specific portion can be produced by a physical unclonable function (PUF) that can use local measurements to create a unique secret known only to the device.

Device 200 can be in communication with an escrow agent 206. Escrow agent 206 can generate an encryption key. The key can be used by the encryption engine 204 to encrypt user data. In various embodiments, the use data can be stored on the device, in the cloud, or the like. The key can be stored locally in the secure memory 208 such that it is only accessible for an authorized user of the device.

In various embodiments, the user may forget a PIN or passcode for accessing the device 200 or the secure memory 208. If the key were only stored in the secure memory 208, it may become difficult or impossible to recover the encrypted user data. However, the escrow agent 206 can create a puzzle for the recovery of the key and store the puzzle in a ledger 210. In various embodiments, the ledger can be stored remote from the device, such that it is accessible even when the device 200 and secure memory 208 are lost or inaccessible. In various embodiments, the ledger can be a blockchain ledger, such that it is widely available. A blockchain ledger can be decentralized and widely available. Additionally, the blockchain ledger can ensure against tampering, providing a trusted and verifiable storage for the key recovery puzzle.

The puzzle can be solvable through a finite amount of work in order to recover the key. In various embodiments, the user can select the complexity of the puzzle, such that a balance can be chosen between the inconvenience of waiting to recover the lost key and the security of the key. A more complex puzzle will take longer to solve providing more security but increasing the delay in recovery.

Figure 3:
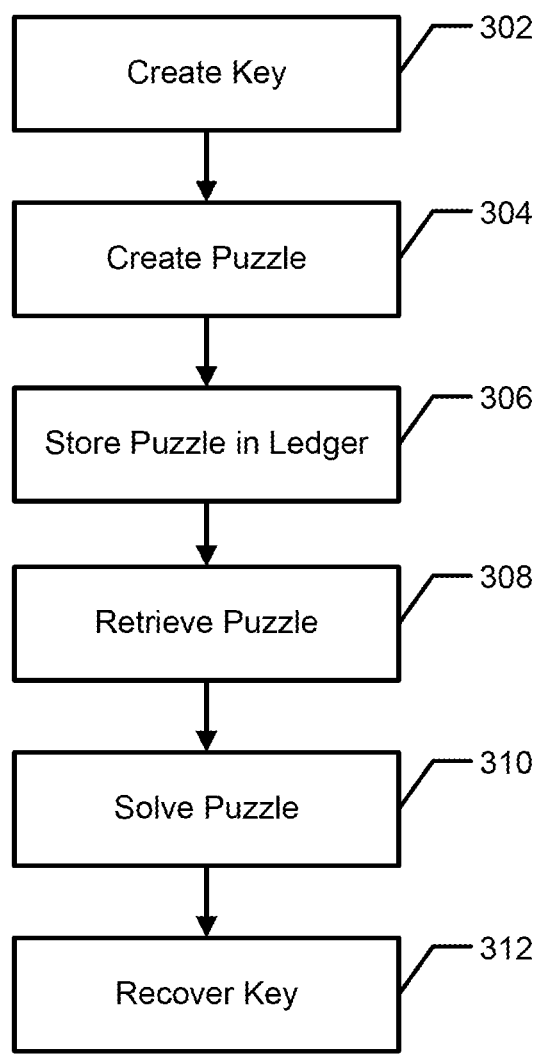
FIG. 3 illustrates a flow diagram of a processes for encryption recovery according to aspects of the disclosure.

FIG. 3 is a flow diagram illustrating a method 300 of providing key recovery. At 302, the key is created. The key can be an encryption key for encryption and decryption of user data. Additionally, the key can be stored in a secure memory of a device protected by a user selected PIN or password.

To guard against the loss of date in the event that the user loses access to the secure memory of the device, such as by the loss or destruction of the device or the loss of the PIN or password, the key can be made recoverable. At 304, a puzzle can be created to protect the key. The puzzle can take a finite amount of time to solve, and once solved the key can be recovered. The complexity of the puzzle can be a trade off between the time it takes to recover a lost key and the security needs for the data. A simple puzzle may take less time to recover by an authorized user, but also less time for a third party to steal the key and access the data. At 306, the puzzle can be stored in a ledger. In various embodiments, the ledger can have a high availability, ensure against tampering, and provide trusted and verifiable storage for the key recovery puzzle, such as a blockchain ledger. In various embodiments, the puzzle can be store in the ledger indexed by a user identifier.

At 308, if the key is lost to the user, the puzzle can be retrieved from the ledger. If the ledger is widely distributed and highly available, retrieving the puzzle is not dependent on a technology, service, or device provider being available. For example, if the manufacturer of the device changes direction, goes out of business, or is otherwise unavailable, reliance of the device manufacture for key recovery can be a dead end or result in significant delays to data recovery. Using a provider agnostic blockchain ledger that is widely and publically distributed eliminates reliance on the device provider.

At 310, the puzzle can be solved, and at 312, the key can be recovered. Once recovered, the key can be used to decrypt the user data and restore access to the user.

Figure 4:
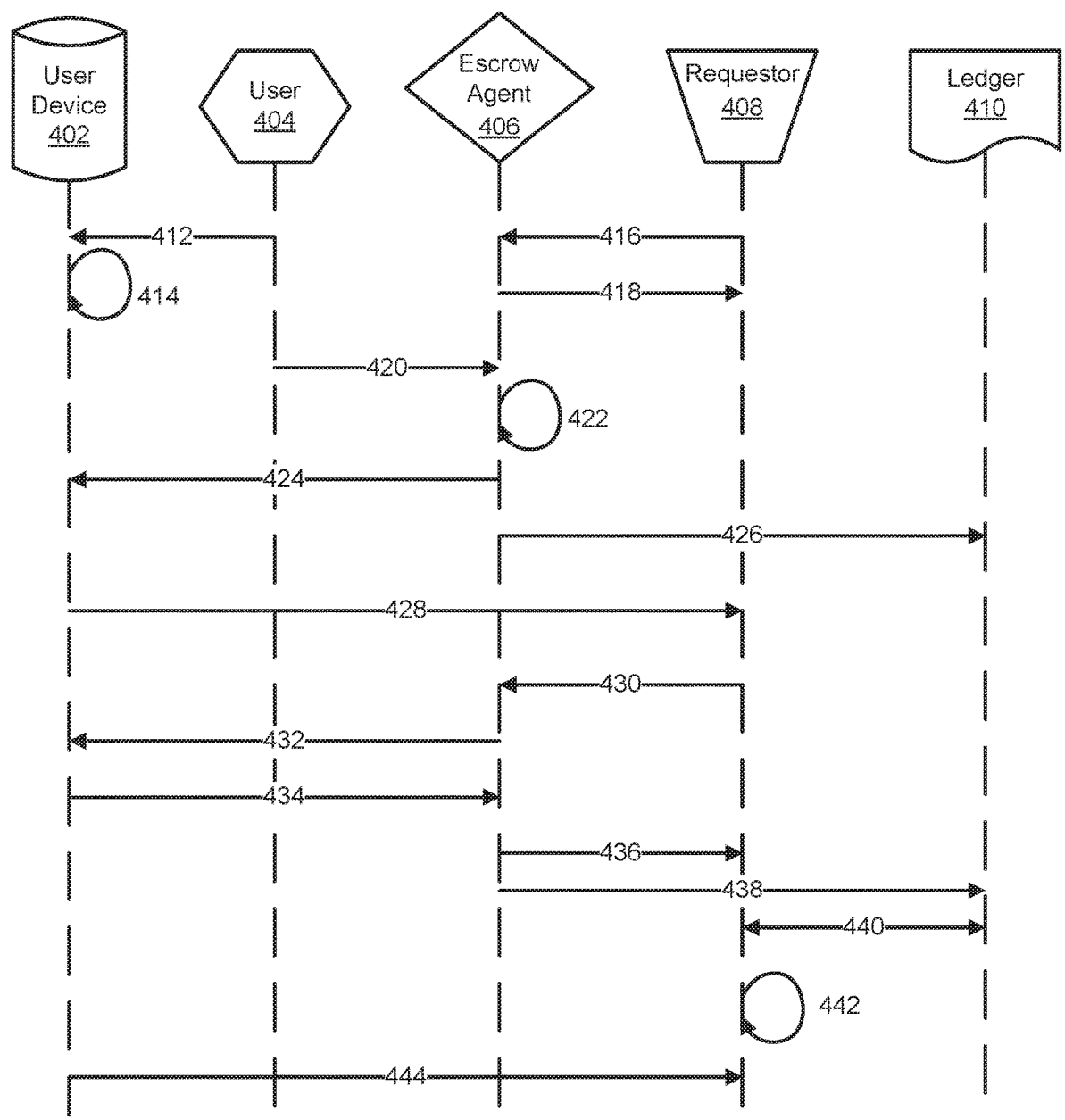
FIG. 4 is a data flow diagram illustrating an exemplary process of key recovery in accordance to aspects of the disclosure.

FIG. 4 is a diagram illustrating data flow through the process of key generation and recovery. The process involves a user device 402, a user 404, an escrow agent 406, a requestor 408, and a ledger 410. Escrow Agent 406 can be a verifiable, trusted and immutable program execution platform for running the key management processes. In various embodiments, the escrow agent 406 can be implemented using smart contracts to ensure the escrow agent code is free from tampering. Ledger 410 can be a public or shared immutable ledger that ensures the user's recovery keys are always available. In various embodiments, the ledger can be implemented as a blockchain ledger.

At 412, when setting up data encryption of user device 402, the user 404 can select a PIN and provide the PIN to the user device 402. At 414, the user device 402 can create a secured storage using the PIN and a unique device code, such as one generated by a PUF. In various embodiments, the physical uncloneable function can take reading of various device sensors, such as light sensors, temperature sensors, motion sensors, orientation sensors, and the like to generate a unique value that cannot be reproduced. In other embodiments, other methods can be used to generate a unique device code. The device can create a cryptographically secure storage by encrypting a dedicated area using a key by concatenating user PIN+PUF.

At 416, the requestor 408 can request the creation of a new account by the escrow agent 406. In various embodiments, the requestor 408 can be the user 404 or an agent of the user 404. At 418, the escrow agent 406 can provide a requestor identifier to the requestor 408 in response to the request 416.

To protect the users data, the users data can be encrypted with a key. The key can be created by the escrow agent 406. The escrow agent 406 can send the key to the device 402 and also publish a protected version of the key in the ledger 410. The protection mechanism can be a puzzle which must be solved before the key can be resolved in order to control decryption key management. In various embodiments, the puzzle can be a 100% solvable puzzle with scalable complexity, such as a Sudoku-like puzzle or other puzzle known in the art of cryptography.

At 420, the user 404 can request the escrow agent 406 to create a key and can request the escrow agent 406 to create a key puzzle of a set strength in the case the user 404 loses their key in the future. The puzzle strength can be set based on user preference to balance their own convenience vs privacy of their data.

At 422, the escrow agent 406 can create a key and can create a puzzle to secure the key. Additionally, the escrow agent may create an additional key to encrypt the puzzle. The additional key can be a device key unique to the device, or can be a key unique to the user and shared among the users' devices.

At 424, the key can be provided to the device 402 for encrypting the user's data. The key can be protected by the device 402 and kept inside the secure storage. In various embodiments, the key may be unique to the device and only be used to encrypt data stored on the device. In other embodiments, the key may be unique to the user and shared across multiple devices operated by the user so that encrypted data can be shared across the devices without decrypting, transmitting, and encrypting on the next device. For example, the multiple user devices can access a common cloud storage with data in the cloud storage encrypted by a shared key. Each device can protect the key in a local secured storage which may be protected with different PINs and PUFs.

At 426, the escrow service 406 can publish the puzzle to the ledger 410 at index location. A user ID can be used as an index to locate data in the ledger 410. In various embodiments, the user ID can be seen in cleartext by the user 404. In various embodiments, the puzzle can be encrypted with a device key to prevent presolving the puzzle. In other embodiments, the puzzle can be encrypted with a user key that is shared among multiple devices owned and operated by the user, such that if a device is lost or destroyed, thus losing the device key, shared data can be recovered using another device that has the user key.

In various embodiments, access to the data can be lost. For example, the user 404 can lose the PIN rendering them are unable to access the secure storage to use the stored key to access their data. In other embodiments, the device can be lost preventing access to the secure storage and the key stored therein. In order to recover the data on the device or in the cloud, the puzzle can be retrieved from the ledger 410. The puzzle can be solved via the escrow agent 406 to recover the key.

At 428, the requestor 408 can initiate the process of recovering the data by obtaining the user ID, and at 430, the requestor 408 can provide the user ID and the requestor ID to the escrow agent 406 to request the key.

Optionally, the escrow agent 406 can seek approval for retrieving the key. At 432, the escrow agent 406 can send the device 402 the requestor ID, and the device can authorize the key retrieval process at 434. For example, the device may authorize the request when the requestor ID matches a known requestor ID. In another example, the device may notify the user 404 of the request and the user 404 may authorize recovery. In various embodiments, when the user 404 has multiple devices 402, the escrow agent 406 can send the request/notification to each of the devices 402 and the user 404 can approve the recovery from any of the devices 402.

At 436, the escrow agent 406 can provide the information necessary to recover the puzzle from the ledger 410 to the requestor 408. The information can include the index as well as the necessary information (device key or user key) to decrypt the puzzle. At 438, the escrow agent 406 can publish the requestor ID to the ledger 410 at the index (user ID) with the details for auditability/accountability.

At 440, the requestor 408 can use the index to look up and download the Puzzle from the ledger 410. At 442, the requestor can decrypt the puzzle, such as by using the device key or user key, and can solve the puzzle using the appropriate algorithm. Solving the puzzle can take the preselected amount of time expending computational resources. The requestor 408 retrieves a decryption key in return for compute resources spent in solving the puzzle.

Having solved the puzzle, the requestor 408 can now decrypt the user data stored on the device or in the cloud, as indicated at 444.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
    a memory for storing user data; and
    a processor configured to:
        create a key;
        store the key in a secure memory;
        create a puzzle to secure the key stored in the secure memory, wherein the puzzle is solvable through a finite amount of work using an appropriate algorithm without use of any additional encryption keys, wherein the puzzle has a scalable complexity and a strength of the puzzle is set based on a user preference;
        publish the puzzle to a ledger, wherein the ledger is a shared immutable ledger to ensure the key is secure and recoverable without dependency on a technology, service or device provider being available;
        encrypt the user data in the memory using the key stored in the secure memory;
        retrieve the puzzle from the ledger when a user has lost access to the key;
        solve the puzzle using the appropriate algorithm to recover the key stored in the secure memory; and
        decrypt the user data.

2. The information handling system of claim 1, wherein the memory includes a secure memory for key storage, the secure memory encrypted with an encryption token.

3. The information handling system of claim 2, wherein the encryption token includes a personal identification number.

4. The information handling system of claim 2, wherein the encryption token includes a value generated by a physical unclonable function.

5. The information handling system of claim 1, wherein the ledger is a blockchain ledger.

6. The information handling system of claim 1, wherein the ledger is indexed with a user identification number.

7. The information handling system of claim 1, wherein the processor is further configured to encrypt the puzzle before storing in the ledger.

8. A method for encryption recovery, comprising:
    creating a key;
    storing the key in a secure memory;
    creating a puzzle to secure the key stored in the secure memory, wherein the puzzle is solvable through a finite amount of work using an appropriate algorithm without use of any additional encryption keys, wherein the puzzle has a scalable complexity and a strength of the puzzle is set based on a user preference;
    publishing the puzzle to a ledger, wherein the ledger is a shared immutable ledger to ensure the key is secure and recoverable without dependency on a technology, service or device provider being available;
    encrypting user data using the key;
    retrieving the puzzle from the ledger when a user has lost access to the key;
    solving using the appropriate algorithm the puzzle to recover the key stored in the secure memory; and
    decrypting the user data.

9. The method of claim 8, further comprising storing the key in a secure memory encrypted with an encryption token.

10. The method of claim 9, wherein the encryption token includes a personal identification number.

11. The method of claim 9, wherein the encryption token includes a value generated by a physical unclonable function.

12. The method of claim 8, wherein the ledger is a blockchain ledger.

13. The method of claim 8, wherein the ledger is indexed with a user identification number.

14. The method of claim 8, further comprising encrypting the puzzle prior to publishing the puzzle in the ledger.

15. An information handling system comprising:
a hardware processor configured to:
create a key;
store the key in a secure memory;
encrypt user data using the key stored in the secure memory;
decrypt the user data using a recovered key when access to the secure memory is unavailable;
create a puzzle to secure the key stored in the secure memory, wherein the puzzle is solvable through a finite amount of work using an appropriate algorithm without use of any additional encryption keys, wherein the puzzle has a scalable complexity and a strength of the puzzle is set based on a user preference;
publish the puzzle to a ledger, wherein the ledger is a shared immutable ledger to ensure the key is secure and recoverable without dependency on a technology, service or device provider being available;
retrieve the puzzle from the ledger when access to the key stored in the secure memory is lost; and
solve the puzzle using the appropriate algorithm to recover the key stored in the secure memory.

16. The information handling system of claim 15, wherein the hardware processor is further configured to store the key in the secure memory encrypted with an encryption token.

17. The information handling system of claim 16, wherein the encryption token includes a personal identification number.

18. The information handling system of claim 16, wherein the encryption token includes a value generated by a physical unclonable function.

19. The information handling system of claim 15, wherein the ledger is a blockchain ledger.

20. The information handling system of claim 15, wherein the ledger is indexed with a user identification number.

* * * * *